United States Patent [19]

Dunn

[11] 4,176,458
[45] Dec. 4, 1979

[54] DISTANCE MEASURING APPARATUS

[76] Inventor: Christopher H. Dunn, 23 Emily St., Parry Sound, Ontario, Canada

[21] Appl. No.: 890,274

[22] Filed: Mar. 27, 1978

[51] Int. Cl.² .............................................. G01B 3/12
[52] U.S. Cl. ................................................. 33/141 E
[58] Field of Search .......................... 33/141 R, 141 E

[56] References Cited

U.S. PATENT DOCUMENTS

| | | | |
|---|---|---|---|
| 2,294,566 | 9/1942 | Malm et al. | 33/141 R |
| 2,741,031 | 4/1956 | Martin et al. | 33/141 R |
| 3,497,959 | 3/1970 | Engelsman | 33/141 R |

*Primary Examiner*—Steven L. Stephan
*Attorney, Agent, or Firm*—Robert D. Farkas

[57] ABSTRACT

A distance measuring apparatus utilizes a removeable wheel journaled to one end of an extensible handle. The wheel is provided with a plurality of equally spaced reflectors or protrusions on one lateral surface thereof. A pick up device, mounted to an adjacent end of the handle, sensing the position of each reflector or protrusion, sending a pulse-like signal to a counting device feeding a memory bank. A converting unit operates a digital display unit such that the digital display will signal the number of turns which the wheel takes when moved along, in contact with the surface of the ground contacting the wheel perimeter.

5 Claims, 5 Drawing Figures

DISTANCE MEASURING APPARATUS

BACKGROUND OF THE INVENTION

1. The Field of the Invention

This invention relates to distance measuring apparatus and more particularly to that class of device which displays the distance that is measured by the apparatus electronically at a location convenient to the user.

2. Description of the Prior Art

The prior art abounds with distance measuring instruments. U.S. Pat. No. 3,835,453 issued Sept. 17, 1974 to N. G. Polydoris teaches a measuring instrument for measuring linear distance on a surface by rolling a wheel on the surface along the linear distance to be measured. The wheel is mounted in a housing. The wheel is drivingly connected to a counter, which indicates the distance which the wheel has rolled. The counter is calibrated to indicate linear measurement in a selected system of measurement. A fastener is mounted in the housing. A collapsible handle is releasably connected to the fastener for manipulating the measuring instrument. The handle may be selectively removed from the instrument for convenient storage and handling. The Polydoris teachings suffer the deficiency of providing an indicating counter mounted adjacent the wheel and usable only in one selected system of linear measurement. Conversion factors must be employed in mathematically converting the system of measurement to any other desired measurement scheme. U.S. Pat. No. 3,251,132 issued May 17, 1966 to B. D. Hall discloses a wheel rotationally secured to the end of an elongated collapsible shaft having a mechanical counter secured thereto. The rotation of the wheel causes the counter to shift its digital-like display to preferred locations. A reset button is provided permitting the counter to be reset to a zero or starting position. Mechanical force, exerted on the wheel, must be of sufficient magnitude to operate the counter mechanism. Thus, the wheel perimeter, contacting the ground, must be pushed up against the ground with sufficient force so as to cause wear and tear thereon in order to effectively and reliably operate the counter, such being the case as well in the Polydoris teachings.

U.S. Pat. No. 1,401,913 issued Dec. 27, 1921 to D. G. Loraine describes a measuring device particularly suitable for measuring the length of a cable or cord when moving in contacting relationship with the perimeter of a wheel. A manually operated brake is disclosed such that the brake is utilized to prevent excessive rotation of the wheel, due to the inertia thereof, once having been started into motion by the motion of the line, cord or cable whose length is to be measured. A digital type mechanical counter is operated by the rotation of the wheel. The Loraine apparatus unfortunately possesses substantial inertia, due to its construction, thereby necessitating the use of the manually operated brake. This is in part due to the amount of friction required to operate the wheel, when contacting the line, cord or cable.

U.S. Pat. No. 1,718,052 issued Jan. 18, 1929 to W. C. Lineaweaver discloses a housing having a gear train mounted therein. One end of the gear train terminates in a wheel whose perimeter is partially permitted to be exposed, outwardly of the housing. The other end of the gear train is coupled to a clocklike hand which is rotationally mounted and secured outwardly of the housing. A circular scale is disposed beneath the hand and located on the exterior of the housing thereby indicating the number of revolutions taken by the wheel which extends outwardly from the housing. The Lineaweaver apparatus, though utilizing a small surface contacting wheel, is particular useful in measuring small distances, such as is normally encountered on maps, charts and the like. However, such small wheel is forced to operate a multiplicity of gears and an indicating hand, thus subjecting the wheel and other gear-like elements of the gear train to be easily worn and become useless.

SUMMARY OF THE INVENTION

A primary object of the present invention is to provide a distance measuring apparatus which couples an indicating device to a wheel in such a way as to minimize the amount of force necessary to rotate the wheel and operate the indicating mechanism thereof.

Another object of the present invention is to provide a distance measuring device whose readout elements are located conveniently to the user, and not adjacent a road contacting portion of the device.

Still another object of the present invention is to provide a measuring apparatus having an extensible handle, thereby facilitating the use of the apparatus by users of different heights and postures.

Yet another object of the present invention is to provide a digital readout instrument which reads the measured distance in a selected distance measurement system, rather than one measurement system.

A further object of the present invention is to provide a distance measuring apparatus wherein the measured distance may be displayed selectively in one of a variety of measurement systems.

Another object of the present invention is to provide a readout device sensibly independent of the inertia of the readout apparatus, thereby minimizing the inertia of the entire measurement mechanism.

Still another object of the present invention is to provide a portable instrument for measuring distance wherein accidental rotation of a measurement wheel will not effect the readout capabilities of the instrument.

Yet another object of the present invention is to provide a readout instrument utilizing conventional electronic components thereby minimizing the cost of manufacture thereof and increasing the durability and reliance of the instrument as a whole.

A further object of the present invention is to provide a distance measuring apparatus in which various wheels, of different diameters, may be easily and readily attached to the apparatus.

Another object of the present invention is to provide a distance measuring apparatus which, in one embodiment thereof, utilizes a constantly applied braking force to the measuring wheel, thereby ensuring that there is no "overshoot" by such readout wheel when contacting the surface of the ground.

Still another object of the present invention is to provide a distance measuring device which utilizes a readout wheel that is not coupled to any other portion of the apparatus, excepting for rotational mounting thereof, so as to totally preclude, in one embodiment thereof, mechanical drag on such readout wheel, minimizing the wear on the surface of the wheel adapted to contact the surface to be measured.

Heretofore, readout wheels, rotationally mounted to handles and the like, are caused to have the perimeter of the wheel drag or contact such surface with sufficient force so that the wheel itself could be coupled to readout devices which required significant amounts of force to operate. Thus, the necessary force required to rotate the wheel, included a component force utilized only to operate the readout mechanism. This additional force component added to the rate at which the surface of the wheel wore thereby shortening the useful life of the readout wheel. Furthermore, prior art devices were divided into two classes of readout mechanisms. One of such classes read out only a single system of measurement, i.e., inches, or feet, or miles, or the like. In this case, the user who required to measure distances in another measurement system was required to mathematically apply various factors so as to convert the used measurement system to the desired measurement system. This took time and was fought with the possibility of error. The other class of apparatus provided two or more readout scales, useful with a mechanically operated measurement device. Since two or more scales were provided in the same space wherein one scale could have been utilized, the ability to accurately readout a distance measurement was hampered. Furthermore, this latter class of apparatus usually provided linear scales of readout, requiring interpretation when reading the scale, adding to the possibility of error by the reader. In addition to these difficulties, prior art devices by virtue of their sturdy construction, possess substantial inertia, causing the measurement wheel and the readout devices coupled thereto to overshoot when stopping the apparatus along its path or, failed to respond instantaneously when first starting the apparatus into motion. The present invention recognizes these difficulties and provides a lightweight, low inertia, easy to rotate removeable wheel which is journaled to an extensible handle having a digital readout system adapted to read the number of revolutions of the wheel without actually creating a drag force on the wheel as the wheel is rotated. An alternate embodiment utilizes the principle of intermittent contact with a portion of the surface of the wheel thereby ensuring that the wheel is effectively braked and will not override once started in motion and lifted from the surface which it contacts. The readout apparatus is suitable for reading out in various measurement systems, such as feet and meters, with equal ease and at the selection of the user. Since the readout is digital in form, the user need not interpret any scale reading obtained thereon.

These objects as well as other objects of the present invention will become more readily apparent after reading the following description of the accompanying drawings.

DESCRIPTION OF THE PREFERRED EMBODIMENT

Figure 2:
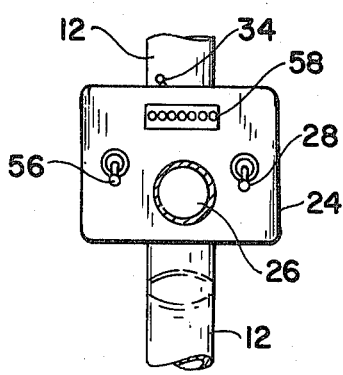
FIG. 2 is a front elevation view of a portion of the apparatus shown in FIG. 1.

The structure and method of fabrication of the present invention is applicable to an elongated rigid handle, having a pair of sections, each telescopingly mounted relative to one another. One of the sections is provided having a free end thereof bent slightly relative to the major length portion thereof. The other section is provided having a smaller cross-section and adapted to be slideably mounted within the other end of the bent section. A suitable locking mechanism, such as a spring loaded pin, mounted extending outwardly from the smaller cross-sectioned handle element is adapted to engage the series of spaced apart holes located in the bent handle element such that the entire length of the handle may be selected at the will of the user by depressing inwardly the biased pin so as to permit the pin to engage a selected hole, positioning the length of the apparatus as desired. Both handle elements are hollow so that an electrical cable can pass therethrough coupling together a box or housing mounted on the bent up handle element and a sensing device mounted adjacent the free end of the smaller cross-sectioned handle element. A wheel, of any desired size, is removeably secured to a shaft extending at right angles to the free end of the smaller cross-sectioned handle element and normal to the longitudinal axis thereof. Thus, the wheel is free to rotate about a line extending normal to the longitudinal axis of the smaller cross-sectioned handle element. The wheel is provided having a rubber-like outermost surface adjacent the perimeter thereof and a plurality of protrusions disposed on one lateral surface of the wheel which is positioned adjacent the exterior surface of the handle element. Such protrusions may be highly polished so as to reflect light easily and are equally spaced apart, located on a bolt circle intermediate the outermost marginal edges of the wheel and the longitudinal axis of the shaft to which it is rotationally journaled. A nut is utilized to maintain the wheel on the shaft, when desired. A plurality of wheels may be utilized, one at a time, each having protrusions spaced apart on equivalent bolt circles on each wheel. A small housing is located on the smaller cross-sectioned handle element such that the housing is disposed adjacent the bolt circle on which the protrusions are located. The housing contains a sensing element adapted to detect the presence of the protrusions as the wheel is caused to rotate by having the perimeter of the wheel contact a surface upon which a distance is to be measured. In one embodiment of the present invention, a mechanically operated momentary switch is disposed within the small housing having the actuating lever thereof extend outwardly therefrom so as to be operated when each protrusion comes into alignment with the actuating lever, causing same to be depressed, thereby tripping the switch element to which it is attached. Alternatively, in another embodiment, the protrusion may act as a light reflector, responsive to and reflecting light generated from a light source, mounted within the small housing, so as to reflect such light inwardly towards the interior of the small housing for impingement onto a photoelectric receiver mounted therein. In this fashion, rotation of the wheel is not deterred in any way since the only protection means, sensitive to the rotation of the wheel, is light rays impinging the wheel surface and on the protrusions. In the latter embodiment of the present invention, those portions of the surface of the wheel disposed intermediate protrusions are preferably coated or colored so as to reflect a minimum amount of light relative to the ability to reflect light of the surface of the protrusions. The upper housing, disposed secured to the bent larger cross-sectioned handle element of the present invention, contains a variety of electrical components therein. Included in these electrical components are a power source, preferably in the form of rechargeable batteries, an on-off selector switch, disposed in series electrical circuitry with the terminals of the battery, an operate switch, a forward-reverse switch, and a converting switch. Further, a memory bank, a converting unit and a digital display unit are housed within the upper larger housing. Each of the aforementioned components are coupled together such that the pick up or revolution sensing device, in the form of the momentary switch or the photoelectric cell, mounted in the lower or smaller housing, operates the digital display unit so as to measure distance which the perimeter of the wheel contacts and is caused to be rotated as the entire apparatus is moved along such surface. Each pulse, obtained either by way of a momentary closing of the protrusion actuated switch or by way of a short burst of current through the photoelectric cell when light is reflected thereinto, causes the memory bank to be actuated once. The operating switch is disposed in series with the momentary switch or photoelectric cell in a series electrical circuit so that when the wheel rotates and the operate switch is closed, the memory bank will record pulses. However, in the event the operate switch is not closed, such as not depressing a thumb-operated lever thereof, the memory bank is insensitive to the mechanical tripping of the momentary switch or the occurrence of light rays striking the surface of the photoelectric cell. The counting device, herein above referred to as either the photoelectric cell or the momentary switch, may be of many different types of devices. Included in other types of devices are capacitance switches, responsive to the location of protrusions in the vicinity thereof, magnetic sensors, responsive to the magnetic properties of the protrusions, contrasted with the magnetic properties of the balance of the wheel, and the like. In short, it can easily be seen that the counting device can be any type of apparatus which does not continuously load mechanically the wheel against rotation and, if desired, can be the kind of device which does not create any drag at all, tending to restrict the free rotation of the wheel. If desired, the forward-reverse switch may be utilized to convert the kinds of pulses generated by the counting device so as to be opposite in direction, thus tending to trigger the memory device in the opposite direction acting just as if the wheel was rotated in a reverse direction. In the event that the counting device is a photoelectric cell, the forward-reverse switch may consist of a diode in series with another diode, wherein each diodes are oppositely directed. The switch itself may thus consist of a single pole double throw switch having, a contact arm thereof coupled to the junction of the pair of diodes and having the free contacts thereof, each coupled to the free ends of the diodes. The entire assembly may be installed in a series circuit arrangement with the photoelectric cell, having a position of the toggle switch selecting only positive or negative going pulses for introduction into the memory bank. The memory bank may be of any conventional type, inclusive of readout memory devices, well known in the art. The output terminal of the memory bank, ordinarily could be fed to an alpha-digital display unit, also well known in the art, if desired. Such a display unit is in fact utilized in the present invention providing a digital readout for the number of pulses stored within the memory bank. However, the converter unit of the present invention is interspersed between the memory bank and the digital display, having the converting switch coupled thereto. The converter unit comprises a conventional multiply/divide function, well known in the art, utilizing standard integrated circuit boards therefor. Thus, the converting switch, when thrown from one position to another, causes the output terminal of the memory bank to provide information to the input terminals of the digital display apparatus, preferably of the light emitting diode variety, to divide such information by a factor equivalent to the number of feet in a meter. Alternatively, throwing the converting switch to the other direction, causes the output terminals of the memory bank to provide input information to the digital display unit such that such information represents multiplying the number of displayed feet into a digital display representing meters. Obviously, as desired, the converter switch may include a wide variety of linear measurement systems in which inches, feet, yards, meters, tenths of miles, miles and the like may be displayed as desired. The converter switch should have indicia displayed relative to the operating lever of the converter switch so that the user will be apprized of the measurement system currently being displayed on the digital display unit. The on-off operating switch, when disposed in open circuited condition, de-energizes all of the apparatus so as to permit the digital display unit, by way of the memory bank, to read zero, when such switch is thrown to a "on" position when ready to operate the equipment again.

In use, the user selects a wheel of any desired diameter consistent with the type of service which he prefers. The size of the wheel does not relate to the measurement accuracy since the bolt circle of protrusions is always of the same diameter having thereon protrusions spaced apart at intervals keyed to the diameter of the wheel. Thus, if the inherent design of the apparatus is to provide one pulse every inch, feeding into the memory bank, a one foot diameter wheel would have twelve protrusions spaced on the bolt circle. Similarly, a two foot diameter wheel would have twenty four protrusions spaced on its bolt circle. The selected wheel is mounted to the shaft, by removing the old wheel, after loosening the nut. The new wheel is inserted for rotation about the shaft, and secured thereto, by tightening the nut. In this position, the protrusions are spaced along a plane adjacent the exterior surface of the smaller housing. The user then operates the on-off switch to the "on" position, providing energizing power to the entire apparatus. Manual rotation of the wheel does not cause the digital display to indicate anything but zero, since the operating switch is not depressed. Presuming that the forward-reverse switch is in the forward position, and presuming that the convert switch is in a measurement system depicting feet, rotation of the wheel, after depressing the operate switch with the thumb of the user, causes the memory bank to see at its input terminals twelve pulses for one rotation of the wheel. The output terminals of the memory bank will provide a signal to the digital display on each twelfth count, causing the digital display to read up to the numeral indication of one. Alternatively, a memory bank may provide inch information to the digital display by having the last two digits thereof read in inches, causing the last digit, preceding the last two digits, to read up one numeral, when the last two digits have reached a count of thirteen. Further rotation of the wheel causes the digital display to read in feet directly, provided that the operating switch is constantly depressed. Releasing the operating switch will not cause the memory bank to lose its stored information nor will it cause the digital display to stop reading. When it is desired to convert the readout of the digital display to another measurement system, say into meters, the converting switch is annularly manipulated into the "meter" position, as shown by indicia located on the outside of the larger housing. When this is done, the output terminals of the memory bank has its signal converted by means well known in the art, such that the signal fed to the input terminals of the digital display unit, to read in meters. Reversing the converter switch, back to its initial position, causes the digital display unit to again read in feet. The forward-reverse switch, when manipulated, causes the input signal to the memory unit to add or subtract to the previous information stored thereon, so that measurements can be made in an additive or subtractive sense without forcing the user to reverse the direction of motion of the wheel along the surface whose length is to measured.

Figure 1:
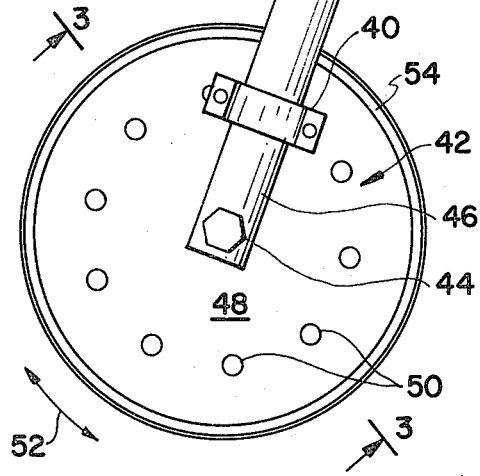
FIG. 1 is a side elevation view of the present invention.

Now referring to the figures, and more particularly to the embodiment illustrated in FIG. 1 showing the present invention 10 having an elongated handle element 12, slideably and telescopingly coupled to a smaller cross-sectioned handle element 14. Pin 16 is shown extending outwardly from hole 18 and may be positioned so as to be located selectively in holes 20 when it is decided to foreshorten the length of the handle comprising elements 12 and 14 thereof. End 22, of handle element 20, is provided with housing 24. Such housing has a push button operating switch mounted therein, coupled to an operating switch lever 26. Toggle switch 28, simulates a forward-reverse switch and an on-off power switch, mounted therebehind. Bend 30 is shown intermediate end 32 and end 22, of handle element 12. Toggle switch 34 represents the operating lever of a converting switch, not shown, also mounted within housing 24. Cable 36 is shown extending within passageway 38, of handle element 14, terminating at one end thereof, not shown, within housing 24, and terminating in the other end thereof, not shown, within smaller housing 40. Wheel 42 is journaled on bolt 44. Bolt 44 is secured to end 46 of handle element 14. Surface 48, of wheel 42, is provided with a plurality of protrusions 50 in spaced apart relationship and arranged so as to be selectively juxtaposed adjacent small housing 40, as wheel 42 rotates in the direction of arrows 52. Perimeter 54, of wheel 42, may be provided with a rubber-like covering, such as rubber, so as to enhance the ability of wheel 42 to frictionally engage a surface, not shown.

FIG. 2 illustrates larger housing 24 shown having on-off operating switch lever 56 secured thereto. Digital display device 58 is positioned so as to be easily read and is disposed adjacent operating lever 26 of the operate switch, not shown, mounted within housing 24.

Figure 3:
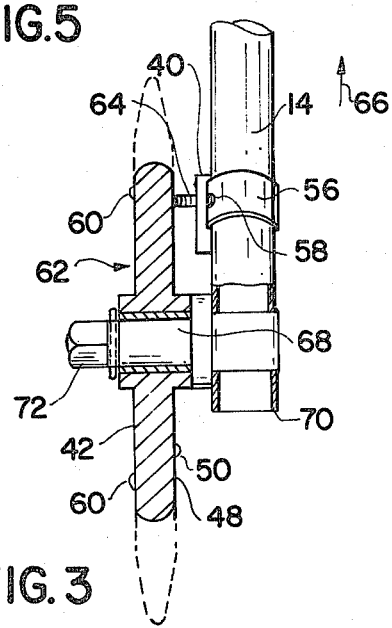
FIG. 3 is a side elevation, cross-sectional view, taken along lines 3—3, viewed in the direction of arrows 3—3 of the apparatus shown in FIG. 1.

FIG. 3 illustrates handle element 14 having strap 56 frictionally engage to the exterior surface thereof. Smaller housing 40 is shown secured to strap 56, utilizing bolt 58 therefor. Protrusions 50 are shown extending outwardly from surface 48 of wheel 42. Protrusions 60 are disposed on surface 62, of wheel 42 and may be utilized in depressing switch element 64, shown extending outwardly from housing 40, or may be used to operate a pick up revolution sensor, not shown, mounted within housing 40, in equivalent fashion as are protrusions 50, when wheel 42 is positioned so as to have surface 62 thereof disposed adjacent housing 40. In such position, strap 56 is moved upwardly, in the direction of arrow 66, by loosening bolt 58, so as to have smaller housing 40 move upwardly as well. Thus, by reversing the mounting alignment of wheel 42, various scales of measurement may be achieved. Bolt 68 is secured to end 70, of handle element 14, having nut 72 removeably threadingly engaged therewith. Thus, removing bolt 72 permits wheel 42 to be mounted in any preferred manner to handle element 14.

Figure 4:
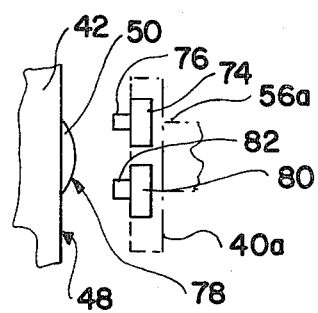
FIG. 4 is an alternate embodiment of a portion of the apparatus shown in FIG. 3.

FIG. 4 illustrates wheel 42 shown having protrusion 50 mounted on surface 48 thereof. If desired, FIG. 4 may be interpreted so as to illustrate protrusions 60, mounted on surface 62 of wheel 42. Dotted lines 40a and dotted lines 56a respectively portray smaller housing 40 and strap 56. Box 74 represents a source of light, having lens 76 mounted thereto directing light rays towards the highly polished surface 78, of protrusion 50. Box 80 represents a photoelectric cell, having lens 82 useful in focusing and collecting light ray emanating from surface 78 towards photoelectric cell 80. If desired, box 74 may be utilized alone, having a magnetic sensor therein or having, if desired a capacitive switch, well known in the art, mounted therein.

Figure 5:
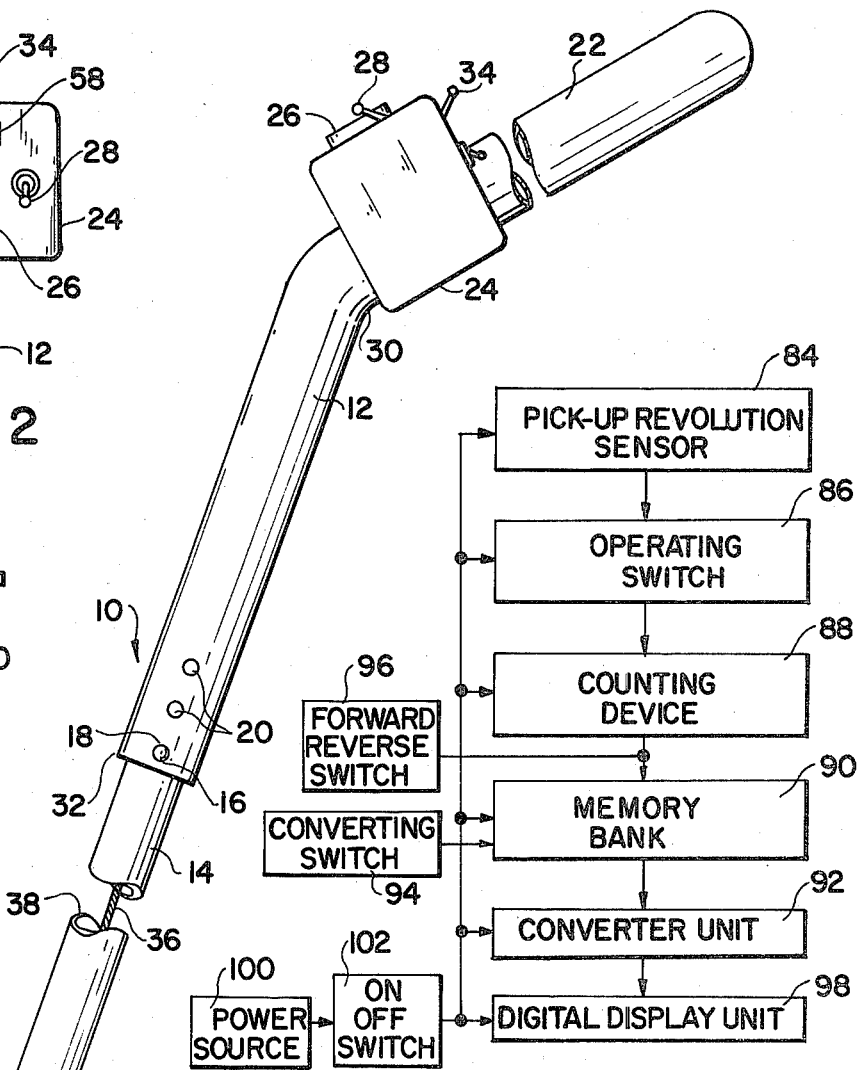
FIG. 5 is a block diagram representation of the electrical components utilized in the apparatus shown in FIG. 1.

FIG. 5 illustrates box 84 representing a pick up revolution sensor, either being a magnetic switch, a photoelectric cell, a momentary switch, a capacitive switch, or the like. A requisite of such sensor is that it must sense the position of a protrusion, not shown, in proximity to a protrusion sensing portion thereof. Box 86 illustrates the operating switch, utilizing push button 26, shown in FIG. 1. Box 88 illustrates a counting device, well known in the art, which accepts the pulses produced by box 84 when the operated switch, depicted as box 86, is closed. Box 88 provides an output signal to box 90, being a memory bank, well known in the art. Box 92 represents a converting unit, being a multiplying or dividing assembly, and controlled by converting switch 94. Box 96 represents a pulse direction switch, which provides selective polarity pulses, in the positive or negative direction, provided at the output terminals of box 88, so that such polarized pulses, occurring in only one direction, may activate the memory bank, herein depicted as box 90. The digital display unit, depicted as box 98, is coupled to box 92. Box 100 represents the power source and has an on-off switch, herein depicted by box 102, coupled thereto, providing energizing power to boxes 84, 88, 90, 92 and 98. Thus, counting device 88, may represent photoelectric cell 80, shown in FIG. 4, directly or, if desired, may represent a counter which when operated by twelve pulses, produces a count of one. If such be the case, box 84 represents the light source 74, shown in FIG. 4. Alternatively, box 84 may represent photoelectric cell 80, shown in FIG. 4, and box 88, shown in FIG. 5, may represent the same twelve counter for the same purposes. Alternatively, should it be desired that digital display unit, herein depicted as box 98, display measurements in inches, the counting device, depicted as box 88, may be deleted. In these fashions, it is entirely up to the designer of the equipment to provide an apparatus which enables him to display measurement systems in small increments, such as inches, to a measurement system which displays a measurement in terms of miles. Additionally, by reversing the wheel, the user may quickly and rapidly change scales read by the digital display unit, herein depicted as box 98, or, if desired, may utilize converting switch 94 for the same purposes.

One of the advantages of the present invention is a distance measuring apparatus which couples an indicating device to a wheel in such a way as to minimize the amount of force necessary to rotate the wheel and operate the indicating mechanism thereof.

Another advantage of the present invention is a distance measuring device whose readout elements are located conveniently to the user, and not adjacent a road contacting portion of the device.

Still another advantage of the present invention is a measuring apparatus having an extensible handle, thereby facilitating the use of the apparatus by users of different heights and postures.

Yet another advantage of the present invention is a digital readout instrument which reads the measured distance in a selected distance measurement system, rather than one measurement system.

A further advantage of the present invention is a distance measuring apparatus wherein the measured distance may be displayed selectively in one of a variety of measurement systems.

Another advantage of the present invention is a readout device sensibly independent of the inertia of the readout apparatus, thereby minimizing the inertia of the entire measurement mechanism.

Still another advantage of the present invention is a portable instrument of measuring distance wherein accidental rotation of a measurement wheel will not effect the readout capabilities of the instrument.

Yet another advantage of the present invention is a readout instrument utilizing conventional electronic components thereby minimizing the cost of manufacture thereof and increasing the durability and reliance of the instrument as a whole.

A further advantage of the present invention is a distance measuring apparatus in which various wheels, of different diameters, may be easily and readily attached to the apparatus.

Another advantage of the present invention is a distance measuring apparatus which, in one embodiment thereof, utilizes a constantly applied braking force to the measuring wheel, thereby ensuring that there is no "overshoot" by such readout wheel when contacting the surface of the ground.

Still another advantage of the present invention is a distance measuring device which utilizes a readout wheel that is not coupled to any other portion of the apparatus, excepting for rotational mounting thereof, so as to totally preclude, in one embodiment thereof, mechanical drag on such readout wheel, minimizing the wear on the surface of the wheel adapted to contact the surface to be measured.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A distance measuring apparatus comprising a handle, a wheel, said wheel removeably secured to one end of said handle, said wheel having a plurality of protrusions mounted to a lateral surface thereof, means to optically sense proximity of each of said plurality of said protrusions including a photoelectric cell, a light source, and said protrusions having a light reflective surface for reflecting light emanating from said light source into said photoelectric cell, said photoelectric cell and said light source being disposed adjacent said lateral surface, means to electrically store in memory the number of protrusions that have come into proximate relationship with said photoelectric cell, means to electrically visibly display a proportional number to a count of said numbers, means to selectively modify said proportional number from one system of linear measurement to another system of linear measurement so displayed.

2. The apparatus as claimed in claim 1 wherein said handle comprises a pair of handle elements, said pair of handle elements being telescopicly secured to one another.

3. The apparatus as claimed in claim 1 wherein said means to visibly display comprises an alpha-numeric display device utilizing a plurality of individual display elements in side by side relationship.

4. The apparatus as claimed in claim 1 wherein said means to selectively modify comprises a manually operated converting switch, said manually operated converting switch having at least two operating positions, one of said operating positions being calibrated for use in measuring feet, the other of said operating positions calibrated for use in measuring meters.

5. The apparatus as claimed in claim 1 wherein said means to sense proximity is slideably affixed to said handle.

* * * * *